(12) United States Patent
Kim et al.

(10) Patent No.: US 8,183,480 B2
(45) Date of Patent: May 22, 2012

(54) WITHDRAWABLE DEVICE OF MAIN CIRCUIT FOR VACUUM CIRCUIT BREAKER

(75) Inventors: Hyun Jae Kim, Chungcheongbuk-Do (KR); Kil-Young Ahn, Daejeon (KR)

(73) Assignee: LS Industrial Systems Co., Ltd., Gyeonggi-Do (KR)

( * ) Notice: Subject to any disclaimer, the term of this patent is extended or adjusted under 35 U.S.C. 154(b) by 335 days.

(21) Appl. No.: 12/645,620

(22) Filed: Dec. 23, 2009

(65) Prior Publication Data

US 2010/0230257 A1    Sep. 16, 2010

(30) Foreign Application Priority Data

Mar. 11, 2009   (KR) .................. 10-2009-0020901

(51) Int. Cl.
    *H01H 33/50* (2006.01)
(52) U.S. Cl. ............... 200/50.21; 200/50.24; 200/50.25; 361/605; 361/609
(58) Field of Classification Search .... 200/50.21–50.25; 361/605–610, 615
    See application file for complete search history.

(56) References Cited

U.S. PATENT DOCUMENTS

| | | | | | |
|---|---|---|---|---|---|
| 2,885,502 | A | * | 5/1959 | Eichelberger et al. | 200/50.25 |
| 3,219,771 | A | * | 11/1965 | Umphrey | 200/50.25 |
| 3,440,371 | A | * | 4/1969 | Stewart et al. | 200/50.24 |
| 3,710,044 | A | * | 1/1973 | Sharp | 200/50.25 |
| 4,396,813 | A | * | 8/1983 | Hesselbart et al. | 200/50.21 |
| 4,823,231 | A | * | 4/1989 | Jego et al. | 361/837 |
| 5,278,722 | A | * | 1/1994 | Peruso | 361/606 |
| 6,028,272 | A | * | 2/2000 | Akers | 200/50.26 |
| 6,490,149 | B2 | * | 12/2002 | Shichida et al. | 361/605 |
| 6,787,725 | B2 | | 9/2004 | Kim et al. | |
| 6,884,949 | B2 | * | 4/2005 | Yoon | 200/50.26 |
| 7,227,279 | B2 | | 6/2007 | Kim | |
| 7,582,837 | B2 | * | 9/2009 | Lyu et al. | 200/50.21 |
| 2004/0112722 | A1 | | 6/2004 | Deylitz et al. | |
| 2004/0212943 | A1 | | 10/2004 | Yoon | |
| 2008/0174940 | A1 | | 7/2008 | Lyu et al. | |

FOREIGN PATENT DOCUMENTS

| | | |
|---|---|---|
| DE | 10006427 | 8/2001 |
| EP | 1914853 | 4/2008 |
| KR | 10-0505052 | 2/2005 |
| WO | 02/087040 | 10/2002 |

OTHER PUBLICATIONS

U.S. Appl. No. 12/633,827 to Park, filed Dec. 9, 2009.

(Continued)

*Primary Examiner* — Michael Friedhofer
(74) *Attorney, Agent, or Firm* — Greenblum & Bernstein P.L.C.

(57) ABSTRACT

Disclosed is a withdrawable device of main circuit for a circuit breaker. A ring-shaped guide recess is formed at a central part of a transfer nut screw-coupled to a lead screw, and supporting surfaces are formed on side surfaces of the guide recess. And, rotation prevention pins are elastically supported by springs in a moving direction of the transfer nut, and are selectively locked, thereby allowing the transfer nut to perform an idle operation. Accordingly, a structure for an idle operation of the transfer nut is simplified, and the number of components is reduced. An axial load is attenuated to a plane-contact distributed load, not a point-contact concentrated load, thereby preventing damage of the components. Also, a vacuum circuit breaker has enhanced reliability of the idle operation at a run position and a test position.

11 Claims, 10 Drawing Sheets

OTHER PUBLICATIONS

U.S. Appl. No. 12/633,863 to Kim et al., filed Dec. 9, 2009.
U.S. Appl. No. 12/635,911 to Woo, filed Dec. 11, 2009.
U.S. Appl. No. 12/641,769 to Kim, filed Dec. 18, 2009.
U.S. Appl. No. 12/641,946 to Seo, filed Dec. 18, 2009.
U.S. Appl. No. 12/645,783 to Kim, filed Dec. 23, 2009.
U.S. Appl. No. 12/651,501 to Tak et al., filed Jan. 4, 2010.

* cited by examiner

WITHDRAWABLE DEVICE OF MAIN CIRCUIT FOR VACUUM CIRCUIT BREAKER

RELATED APPLICATION

The present disclosure relates to subject matter contained in priority Korean Application No. 10-2009-0020901, filed on Mar. 11, 2009, the content of which is incorporated by reference herein in its entirety.

BACKGROUND OF THE INVENTION

1. Field of the Invention

The present invention relates to a withdrawable device of a main circuit for a vacuum circuit breaker, and particularly, to a withdrawable device of main circuit for a circuit breaker capable of being transferred so that a main circuit can is be coupled to or separated from a main frame installed at a rear side of a cradle of a vacuum circuit breaker, and capable of being fixed at a safety position, a test position, and a run position of the vacuum circuit breaker.

2. Background of the Invention

A vacuum circuit breaker serves to protect a power system. The vacuum circuit breaker performs power transmission, power reception, switching, stopping, etc. by using a vacuum interrupter as an extinguisher, and rapidly performs an automatic breaking function when the power system is mal-operated.

And, the vacuum circuit breaker protects a circuit and devices by rapidly interrupting the circuit by an extinguishing function for rapidly spreading an arc into a vacuum vessel, the arc generated when a normal load is open and closed and when an abnormal current is interrupted.

The vacuum circuit breaker largely comprises a main circuit, a transfer carriage, a cradle, and a supplementary device.

The transfer carriage is integrally coupled to the main circuit, and includes a mechanic device for selectively transferring the main circuit to the cradle.

A process for coupling or separating the main circuit to/from the cradle is performed through a tulip contact of the main circuit and a cradle terminal of the cradle. When the vacuum circuit breaker is operated in a state that the main circuit has been coupled to the cradle, a current is introduced into a vacuum interrupter installed in the main circuit through an upper terminal. Then, the introduced current is discharged out through a lower terminal. During this operation, when an accident occurs, the vacuum interrupter instantaneously interrupts the current.

The conventional vacuum circuit breaker and the withdrawable device of a is main circuit for the vacuum circuit breaker will be explained with reference to FIGS. 1 to 3.

FIG. 1 is a perspective view schematically showing a vacuum circuit breaker in accordance with the conventional art, FIG. 2 is a perspective view of a withdrawable device of a main circuit for a vacuum circuit breaker, and FIG. 3 is a planar view of a carriage transfer unit of the withdrawable device of a main circuit for a vacuum circuit breaker.

Referring to FIGS. 1 and 2, the conventional withdrawable device of a main circuit for a vacuum circuit breaker comprises a carriage 100, a cradle 120, a mounting frame 130, a main circuit 140 loaded on the carriage 100, a carriage transfer unit 200 for transferring the carriage 100, a braking unit 204 for limiting a transfer distance of the carriage 100, and a girder assembly 300 for supporting the carriage transfer unit 200.

The carriage 100 includes a box body 101 having a wall body 101a, and two pairs of wheels 102 configured to be inserted into or withdrawn from the cradle 120 along a guide rail installed at an inner side of the cradle 120.

Referring to FIGS. 2 and 3, the carriage transfer unit 200 includes a lead screw 201 inserted into a through hole 101b formed at the wall body 101a of the box body 101 in back and forth directions, a transfer nut 202 screw-coupled to the lead screw 201 and installed at an inner side of the wall body 101a of the box body 101, and a 'U'-shaped bracket 203 fixed to the box body 101 so as to prevent separation of the transfer nut 202 from the lead screw 201.

The transfer nut 202 is provided with a female screw portion 202a screw-coupled to an outer circumferential surface of the lead screw 201. Two guiding recesses 202b having different depths are formed on upper and lower surfaces of is the transfer nut 202, respectively. And, a guide recess 202c is formed at a central part of the transfer nut 202.

A girder 209 is fixedly coupled to the end of the lead screw 201, and is moved in a rotation direction of the lead screw 201 in a state of being disposed on a pair of travel rails 212 and 212' installed on a bottom surface of the box body 101 of the carriage 100 in a length direction, i.e., a moving direction of the transfer carriage. The lead screw 201 is coupled to a withdrawable handle 213, and is rotated in a rotation direction of the withdrawable handle 213 by an operator.

The girder assembly 300 includes a support structure 303 having a space 301 therein and supporting bearings so as to transmit a rotation force to the front end of the lead screw 201, right and left sliding plates 304 at both inner sides of the support structure 303 so as to be movable in right and left directions, right and left handles 305' and 305 fixed to the right and left sliding plates 304 and outwardly protruding from the support structure 303, and a spring 309 for inserting an end 304a into the cradle 120 by outwardly moving the right and left sliding plates 304' and 304.

The braking unit 204 is provided with forward and backward rotation prevention pins 205 and 205' in a diagonal direction of the bracket 203 so as to be detachably inserted into the guiding recesses 202b formed on the upper and lower surfaces of the transfer nut 202. And, the forward and backward rotation prevention pins 205 and 205' are connected to right and left driving pins 207' and 207 by connection plates 206 and 206'.

The right and left driving pins 207' and 207 are elastically supported by springs 208' and 208, respectively. And, the right and left driving pins 207' and 207 are configured to be pressed by side surfaces of the girder assembly 300 and the girder 209 installed at the ends of the lead screw 201 when the carriage 100 is moved in back and forth directions.

The guide pins 210 are installed at a pair of supporting plates 211 and 211'.

When the backward rotation prevention pin 205' or the forward rotation prevention pin 205 is separated from the guiding recesses 202b of the transfer nut 202 by the right and left driving pins 207' and 207, the guide pins 210 are inserted into the guide recess 202c of the transfer nut 202 thus to locate the transfer nut 202 at a front side.

Unexplained reference numeral 141 denotes busbars, 214 denotes bearings, and 500 denotes a withdrawable device.

The conventional withdrawable device of the main circuit for the vacuum circuit breaker may have lowered reliability due to a large number of components and a complicated structure.

More concretely, the withdrawable device includes the transfer nut 202 provided at the carriage transfer unit 200 and performing an idle operation at a run position and a test position of the vacuum circuit breaker, the forward and backward rotation preventing pins 205 and 205', the connection plates 206 and 206', the guide pins 210, etc. These components are assembled to each other with a complicated structure. Accordingly, in case that the main circuit 140 and the cradle 120 are assembled to each other in a non-aligned manner, the components may be transformed due to great force in an axial direction. This may cause the vacuum circuit breaker to unstably operate, thereby lowering reliability of the vacuum circuit breaker.

For instance, when the vacuum circuit breaker is moved to a run position from a test position, the guide pins 210 point-contact the transfer nut 202 due to is an axial load occurring when a tulip contact of the main circuit contacts a cradle terminal, and due to an axial load occurring when the main circuit and the cradle terminal are not aligned to each other. As a result, a maximum concentrated load of 500 kgf may occur to damage the guide pins 210. Furthermore, when the vacuum circuit breaker is in the run position or test position, an idle operation is not smoothly performed, but the guide pins may be abraded due to friction.

SUMMARY OF THE INVENTION

Therefore, an object of the present invention is to provide a withdrawable device of a main circuit for a vacuum circuit breaker, capable of simplifying a structure for an idle operation and reducing the number of components, capable of preventing damage of the components by attenuating an axial load to a plane-contact distributed load, and capable of enhancing reliability of the idle operation at a run position and a test position of the vacuum circuit breaker.

To achieve these and other advantages and in accordance with the purpose of the present invention, as embodied and broadly described herein, there is provided a withdrawable device of a main circuit for a vacuum circuit breaker, comprising: a cradle; a carrier having a main circuit loaded thereon and movably disposed in the cradle, the main circuit electrically connected to or separated from the cradle; a lead screw for moving the carrier in back and forth directions with respect to the cradle; a transfer nut coupled to the carrier so as to be screw-coupled to the lead screw, for selectively transmitting a rotation force of the lead screw to the carrier according to a rotation direction of the lead screw; and a plurality of rotation prevention pins coupled to the transfer nut, for allowing the transfer nut to transmit a rotation force of the lead screw to the carrier while the carrier is being moved, and for allowing the transfer nut to perform an idle operation when the carrier has been completely moved, wherein a guide recess having a ring shape are formed on an outer circumferential surface of the transfer nut in a circumferential direction such that the rotation prevention pins are inserted thereinto in a radius direction to slide in a circumferential direction, and wherein a plurality of supporting surfaces are symmetrically formed on both sidewalls of the guide recess such that the rotation prevention pins are supported in opposite directions to each other.

The supporting surfaces of the guide recess may be formed to be stepped in a direction perpendicular to a rotation direction of the transfer nut, and may be provided with a plurality of inclination surfaces inclinably extending therefrom in opposite directions to each other and connected to the both sidewalls of the guide recess.

A plurality of driving pins may be coupled to the plurality of rotation prevention pins such that the rotation prevention pins are selectively separated from the supporting surfaces by moving in a length direction of the lead screw. And, the driving pins may be disposed in a length direction of the lead screw.

The plurality of driving pins may be protrudingly formed in opposite directions to each other, and may be configured such that one driving pin is selectively moved according to a rotation direction of the lead screw thereby to separate the corresponding rotation prevention pin from the supporting surface.

The carrier may be provided with a girder for rotatably fixing one end of the lead screw thereto. And, one of the plurality of driving pins may be moved by being supported by the girder according to a rotation direction of the lead screw. A girder assembly for rotatably fixing another end of the lead screw may be selectively fixed to the cradle. And, another of the plurality of driving pins may be moved by being supported by the girder assembly according to a rotation direction of the lead screw.

The rotation prevention pins may comprise a head portion supported by an outer circumference of the driving pins, a body portion extending from the head portion to be inserted into the driving pins, and a supporting portion extending from the body portion and locked by the guide recess of the transfer nut.

The transfer nut may be accommodated in a bracket fixed to the carrier, and the plurality of driving pins may be slidably coupled to the bracket by being elastically supported in opposite directions to each other with respect to the bracket.

A thrust bearing for supporting an idle operation of the transfer nut at the lead screw may be provided at the bracket.

A guide plate for restricting the rotation prevention pins such that the rotation prevention pins are linearly moved along the lead screw may be provided at the bracket.

Buffer members for supporting the driving pins with respect to the carrier may be provided at the driving pins.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
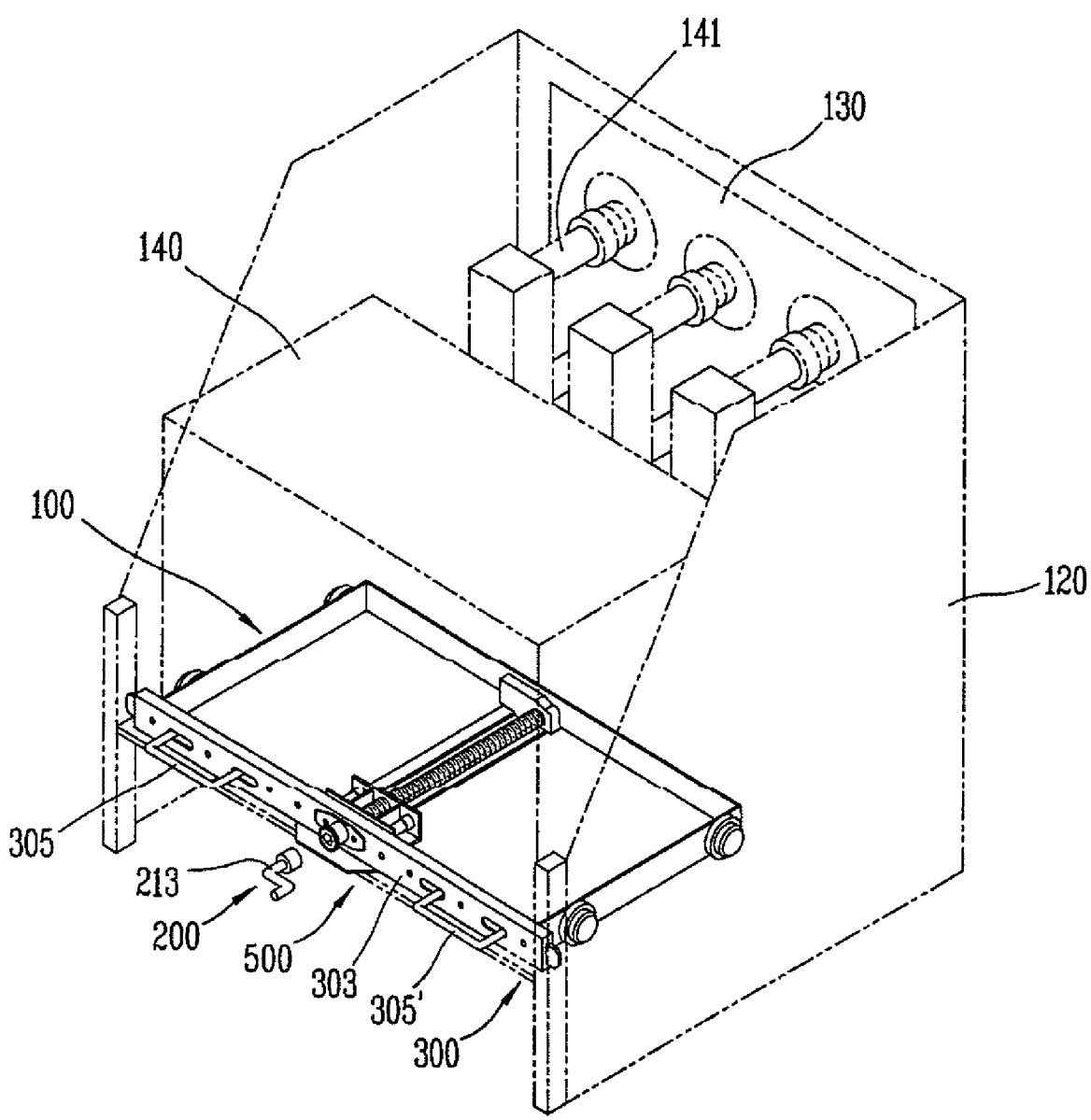
FIG. 1 is a perspective view schematically showing a vacuum circuit breaker in accordance with the conventional art.
Figure 2:
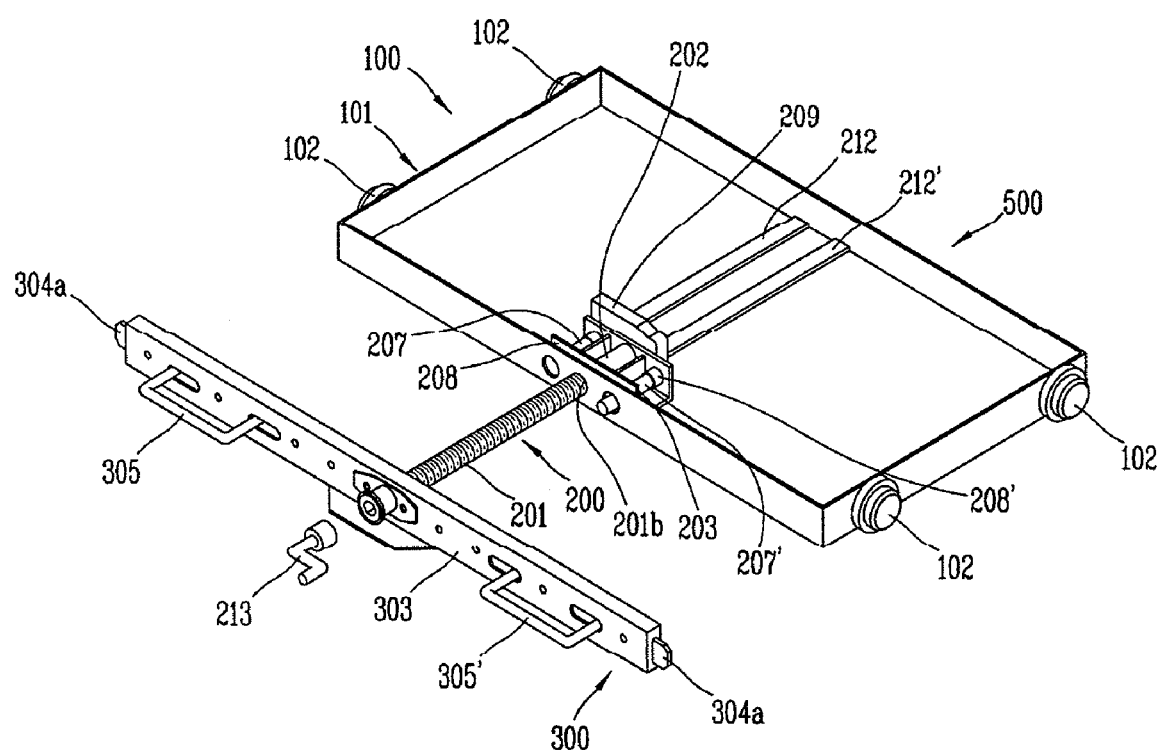
FIG. 2 is a perspective view of a withdrawable device of a main circuit for a vacuum circuit breaker.
Figure 3:
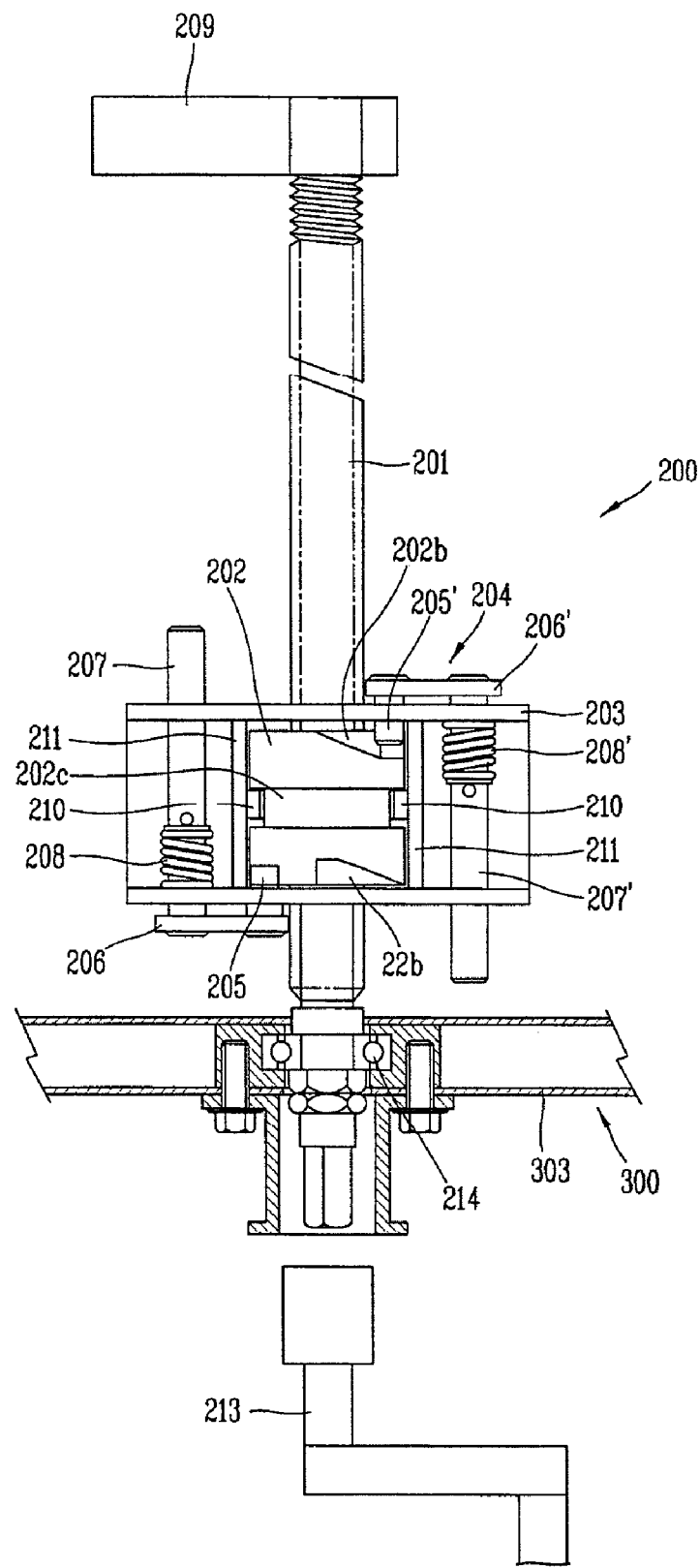
FIG. 3 is a planar view of a carriage transfer unit of the withdrawable device of a main circuit for a vacuum circuit breaker.

Description will now be given in detail of the present invention, with reference to the accompanying drawings.

Hereinafter, a withdrawable device of a main circuit for a vacuum circuit breaker according to the present invention will be explained in more detail with reference to the attached drawings.

In the drawings, lines may be expressed in thick thicknesses, or components may be expressed in large sizes for clarity and convenience. And, the terms to be later explained are defined with consideration of the functions of the present invention, which may become different according to a user or operator's intention or convention. Accordingly, the definitions of the terms should be understood through the entire contents of the specification of the present invention.

Figure 4:
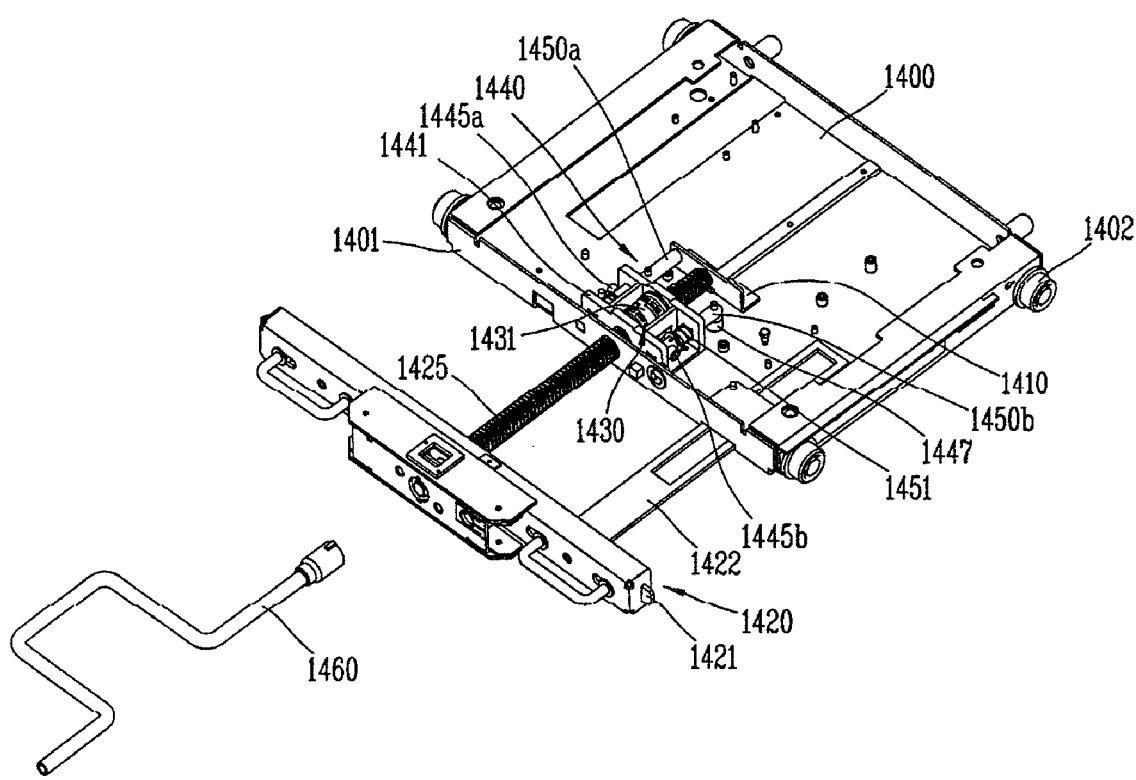
FIG. 4 is a partial disassembled view of a withdrawable device of a main circuit for a vacuum circuit breaker according to a first embodiment of the present invention.
Figure 5:
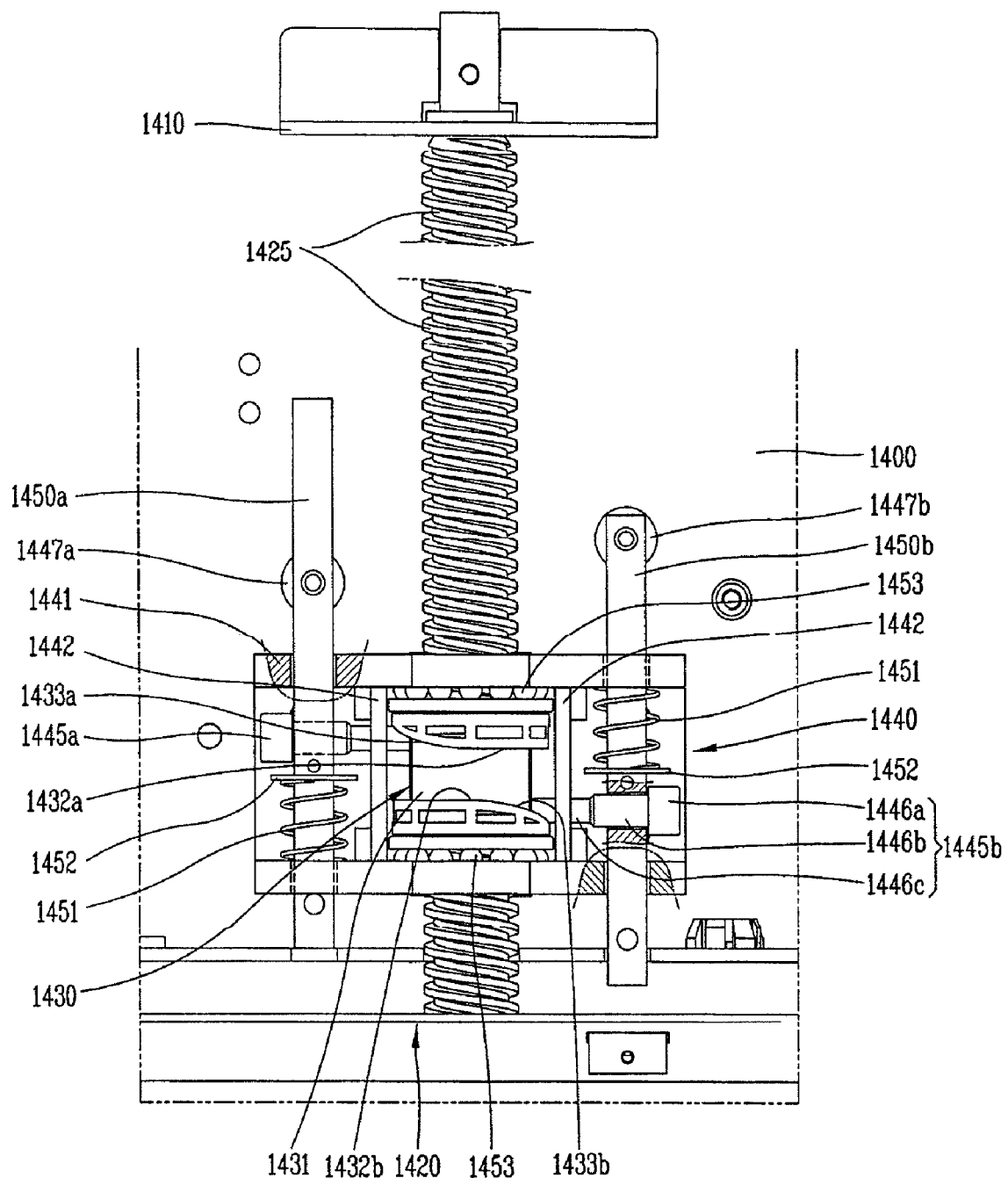
FIG. 5 is a planar view of a carrier and an idling unit of FIG. 4.

Referring to FIGS. 4 and 5, the withdrawable device of a main circuit for a vacuum circuit breaker according to a first embodiment of the present invention comprises: a carrier 1400 having a main circuit 140 (FIG. 1) loaded thereon and detachably mounted to a cradle 120 (FIG. 1); a lead screw 1425 installed between the cradle 120 and the carrier 1400 for inserting or withdrawing the carrier 1400 into/from the cradle 120 according to a rotation direction; a transfer nut 1430 screw-coupled to the lead screw 1425 for allowing the lead screw 1425 to perform a selective idle operation; an idling unit 1440 for allowing the transfer nut 1430 to perform a selective idle operation; and a girder 1410 and a girder assembly 1420 respectively coupled to the lead screw 1425 at both sides of a transfer direction of the carrier 1400 for transferring the carrier 1400.

The carrier 1400 is movably installed in the cradle 120, and carries the main circuit into the cradle 120. The carrier 1400 is provided with wheels linearly moved by being supported by both inner sidewalls of the cradle 120.

The lead screw 1425 passes through a front plate 1401 vertically formed at a front surface of the carrier 1400, thereby being screw-coupled to the transfer nut 1430 of the idling unit 1440. And, the lead screw 1425 is connected to the girder 1410 slidably-coupled to the carrier 1400.

A female screw thread screw-coupled to the lead screw 1425 is formed in the transfer nut 1430, and a ring-shaped guide recess 1431 is formed at an outer central part of the transfer nut 1430.

The idling unit 1440 includes a bracket 1441 fixed onto the carrier 1400 and having the transfer nut 1430 mounted therein, and right and left rotation prevention pins 1445b and 1445a elastically supported with respect to a moving direction of the transfer nut 1430 for selectively preventing rotation of the transfer nut 1430 by being locked by side surfaces of the guide recess 1431.

Here, the left rotation prevention pin 1445a prevents clockwise rotation of the transfer nut 1430, and the right rotation prevention pin 1445b prevents counterclockwise rotation of the transfer nut 1430. And, the idling unit 1440 selectively moves the right and left rotation prevention pins 1445b and 1445a to the guide recess 1431 of the transfer nut 1430 according to a rotation direction of the transfer nut 1430 in a state that the movement of the transfer nut 1430 is stopped, thereby allowing the transfer nut 1430 to be rotated.

The end of the lead screw 1425 is rotatably coupled to the girder 1410, and the girder 1410 is installed at the carrier 1400 so as to be linearly and slidably moved by rotation of the lead screw 1425. And, the girder 1410 presses the left rotation prevention pin 1445a in an opposite direction to a moving direction of the transfer nut 1430 when the transfer nut 1430 is moved to a front side of the carrier 1400, i.e., a direction far from the girder assembly 1420 as the lead screw 1425 is counterclockwise rotated.

The girder assembly 1420 is connected to the carrier 1400 by the slider 1442 at an opposite side to the lead screw 1425 to which the girder 1410 has been coupled. The lead screw 1425 has its end coupled to the girder assembly 1420 so as to perform an idle operation, and presses the right rotation prevention pin 1445b in an opposite direction to a moving direction of the transfer nut 1430.

Figure 6:
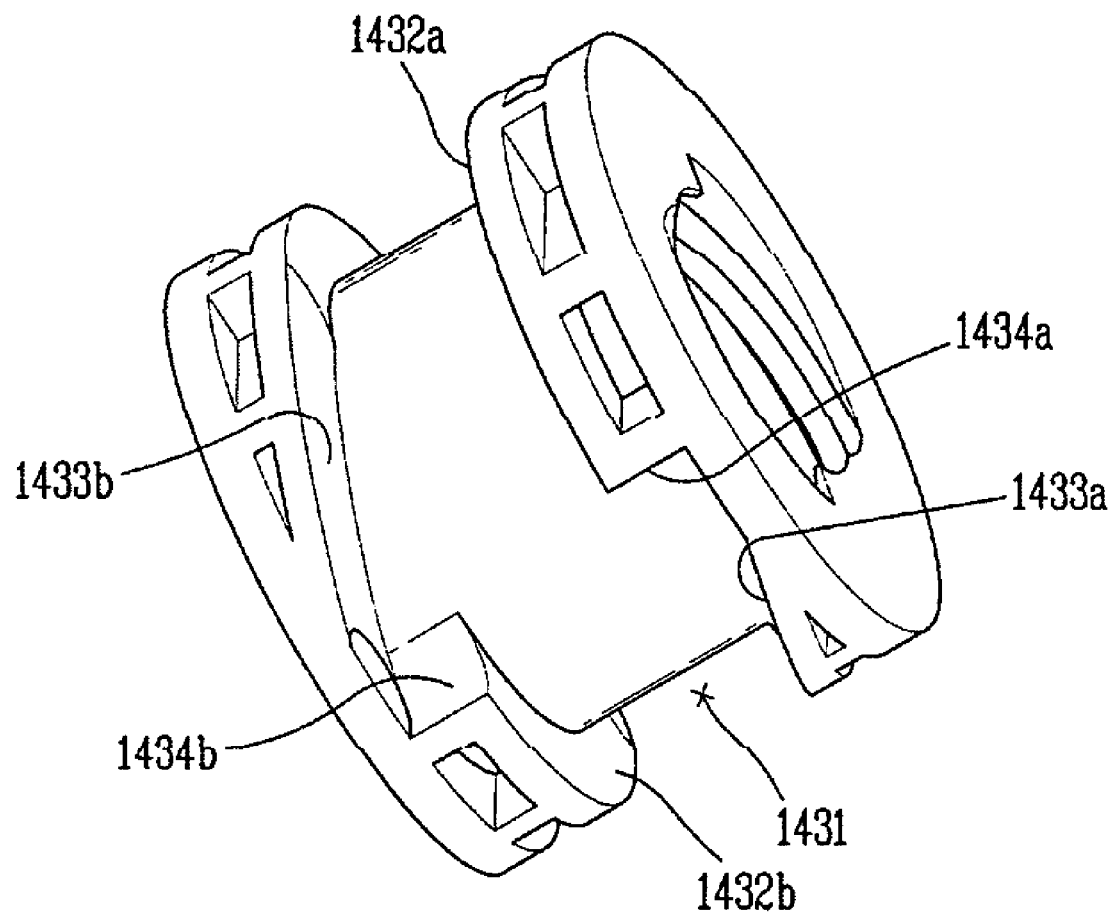
FIG. 6 is a perspective view of a transfer nut of FIG. 4.

Referring to FIG. 6, the transfer nut 1430 includes one ring-shaped guide recess 1431 formed on an outer circumferential surface thereof, first and second ring-shaped surfaces 1432a and 1432b formed on left and right side surfaces of the guide recess 1431 for allowing the transfer nut 1430 to perform an idle operation with respect to the left and right rotation prevention pins 1445a and 1445b, first and second inclination surfaces 1433a and 1433b inclinably extending from the first and second ring-shaped surfaces 1432a and 1432b in opposite directions to each other for guiding the left and right rotation prevention pins 1445a and 1445b in a length direction of the transfer nut 1430, and first and second supporting surfaces 1434a and 1434b vertically extending from the ends of the first and second inclination surfaces 1433a and 1433b towards the ring-shaped surfaces 1432a and 1432b for supporting the left and right rotation prevention pins 1445a and 1445b.

The first inclination surface 1433a is formed to be inclined towards a rear left side so that the left rotation prevention pin 1445a can be separated from the first supporting surface 1434a to be guided to the first ring-shaped surface 1432a is when the transfer nut 1430 is counterclockwise rotated together with the lead screw 1425. Accordingly, the left rotation prevention pin 1445a is supported by the first supporting surface 1434a, thereby preventing the transfer nut 1430 from rotating in a clockwise direction.

The second inclination surface 1433b is formed to be inclined towards a front right side so that the right rotation prevention pin 1445b can be separated from the second supporting surface 1434b to be guided to the second ring-shaped surface 1432b when the transfer nut 1430 is clockwise rotated together with the lead screw 1425. Accordingly, the right rotation prevention pin 1445b is supported by the second supporting surface 1434b, thereby preventing the transfer nut 1430 from rotating in a counterclockwise direction.

The left and right rotation prevention pins 1445a and 1445b include head portions (not shown) 1446a supported by outer circumferences of the left and right driving pins 1450a and 1450b to be later explained, body portions (not shown) 1446b extending from the head portions (not shown) 1446a and penetratingly-coupled to the left and right driving pins 1450a and 1450b, and supporting portions (not shown) 1446c extending from the body portions (not shown) 1446b and locked by the guide recess of the transfer nut.

The left and right driving pins 1450a and 1450b are movably installed at both sides of the bracket 1441, and are respectively supported by a spring 1451 in opposite directions to each other with respect to the bracket 1441. And, the left and right driving pins 1450a and 1450b are protruding from the bracket 1441, and pressed in opposite directions to each other. Accordingly, the left and right driving pins 1450a and 1450b move the left and right rotation prevention pins 1445a and 1445b installed at both sides of the transfer nut 1430 in opposite directions to each other. A disc-shaped plate 1452 for supporting the spring 1451 is provided on the outer circumferences of the left and right driving pins 1450a and 1450b.

A thrust bearing 1453 for supporting an idle operation of the transfer nut 1430 at the lead screw 1425 is provided at the bracket 1441, thereby supporting front and rear surfaces of the transfer nut 1430. When the transfer nut 1430 performs an idle operation by approaching to the girder 1410 or the girder assembly 1420 by the lead screw 1425, the thrust bearing 1453 reduces frictional force occurring between a front surface or a rear surface of the transfer nut 1430 and an inner surface of the bracket 1441. That is, the thrust bearing 1453 attenuates an axial load of the transfer nut 1430 to a distributed load on the front and rear surfaces of the transfer nut 1430 and front and rear surfaces thereof, thereby preventing damage of the transfer nut 1430 and allowing the transfer nut 1430 to smoothly perform an idle operation.

A guide plate 1442 for locking the left and right rotation prevention pins 1445a and 1445b so that they can be linearly moved along the lead screw 1425 is s provided at the bracket 1441. And, buffer members 1447a and 1447b for supporting the left and right rotation prevention pins 1450a and 1450b with respect to the carrier 1400 are provided at the left and right driving pins 1450a and 1450b, respectively.

The withdrawable device of the main circuit for a vacuum circuit breaker according to the present invention has the following operational effects.

The operational effects of the present invention are related to an idle operation of the transfer nut 1430 in the bracket 1441, which will be explained with reference to FIGS. 7 to 10.

A process for connecting the tulip contact of the main circuit to the busbar by inserting the main circuit into the cradle by the carrier 1400 was disclosed in the background of the present invention as a well-known technique. Accordingly, detailed explanations of the process will be omitted.

Once the carrier 1400 is backwardly moved in a state that the girder assembly 1429 has been fixed to the cradle, the main circuit is coupled to a mounting frame. Then, an operational current is introduced into the vacuum interrupter installed in the main circuit through an upper busbar, and the introduced current is discharged out through a lower busbar. Under this state, in the even of the occurrence of an abnormal current, the vacuum interrupter instantaneously interrupts the abnormal current.

Under this state, the main circuit may be disassembled from the mounting frame for repair. More concretely, in a state that the main circuit has been coupled to the mounting frame, an operator inserts a withdrawable handle 1460 to a handle insertion opening, thereby rotating the lead screw 1425 in a clockwise direction. Then, the transfer nut 1430 is forwardly moved along the lead screw 1425, and the carrier 1400 is moved by the transfer nut 1430. As a result, the main circuit is forwardly moved, and thereby the main circuit is disassembled from the mounting frame.

Under this state, a repair process is performed. Then, the main circuit is coupled to the mounting frame. When the operator rotates the lead screw 1425 in a counterclockwise direction by using the withdrawable handle 1460, the carrier 1400 is backwardly moved and thereby the main circuit is coupled to the mounting frame.

Figure 7:
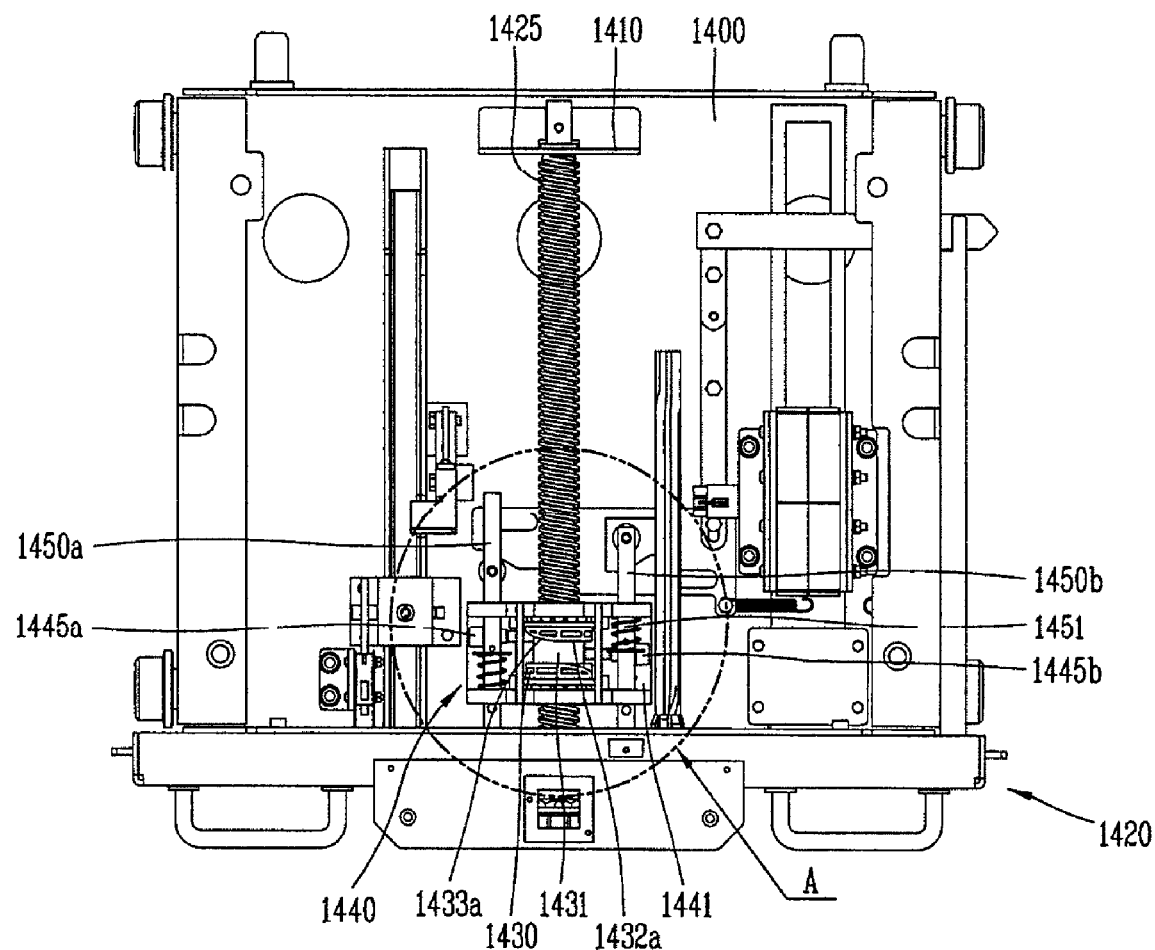
FIG. 7 is a view showing a state of the withdrawable device of a main circuit for a vacuum circuit breaker of FIG. 4 before a tulip contact of a main circuit is connected to a busbar of a cradle.
Figure 8:
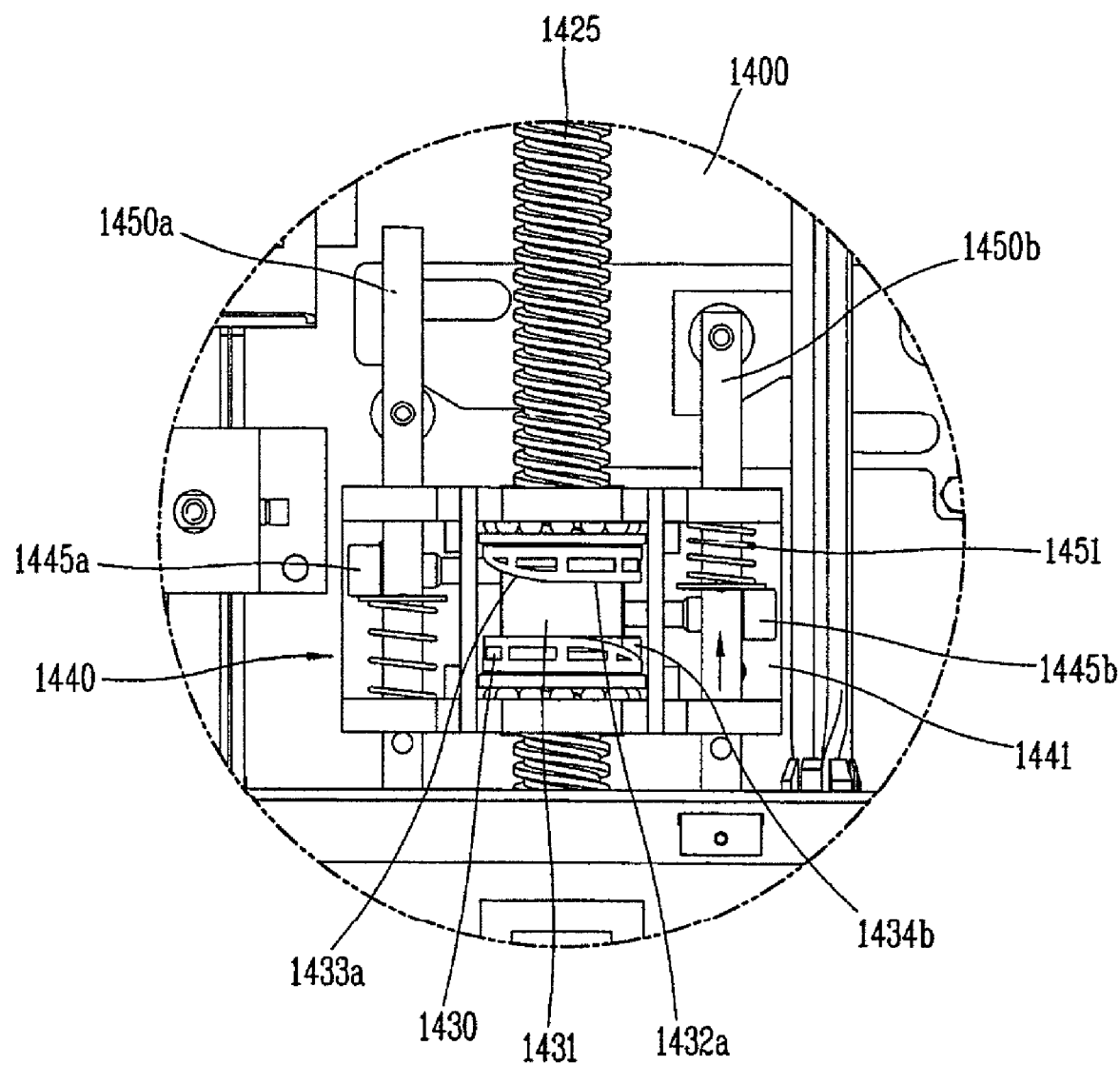
FIG. 8 is an enlarged planar view of a part 'A' in FIG. 7.

As shown in FIGS. 7 and 8, when the carrier 1400 has been completely moved to the front side by the lead screw 1425 and the transfer nut 1430, i.e., when the vacuum circuit breaker is in a test position, the transfer nut 1430 is completely moved to the front side along the lead screw 1425. Accordingly, the right driving pin 1450b comes in contact with the girder assembly 1420. Then, the right driving pin 1450b is pushed a little to the rear side, and the right rotation prevention pin 1445b is also pushed a little to the rear side. As a result, the end of the right rotation prevention pin 1445b is separated from the second supporting surface 1434b of the transfer nut 1430, thereby allowing the transfer nut 1430 to perform an idle operation. This may cause the carrier 1400 not to be moved any longer. Here, the left rotation prevention pin 1445a is disposed within a range of a height direction of the first supporting surface 1424a, but consecutively moves to the first inclination surface 1433a, the first ring-shaped surface 1432a, and the first supporting surface 1434a. Accordingly, the transfer nut 1430 is able to perform an idle operation.

Figure 9:
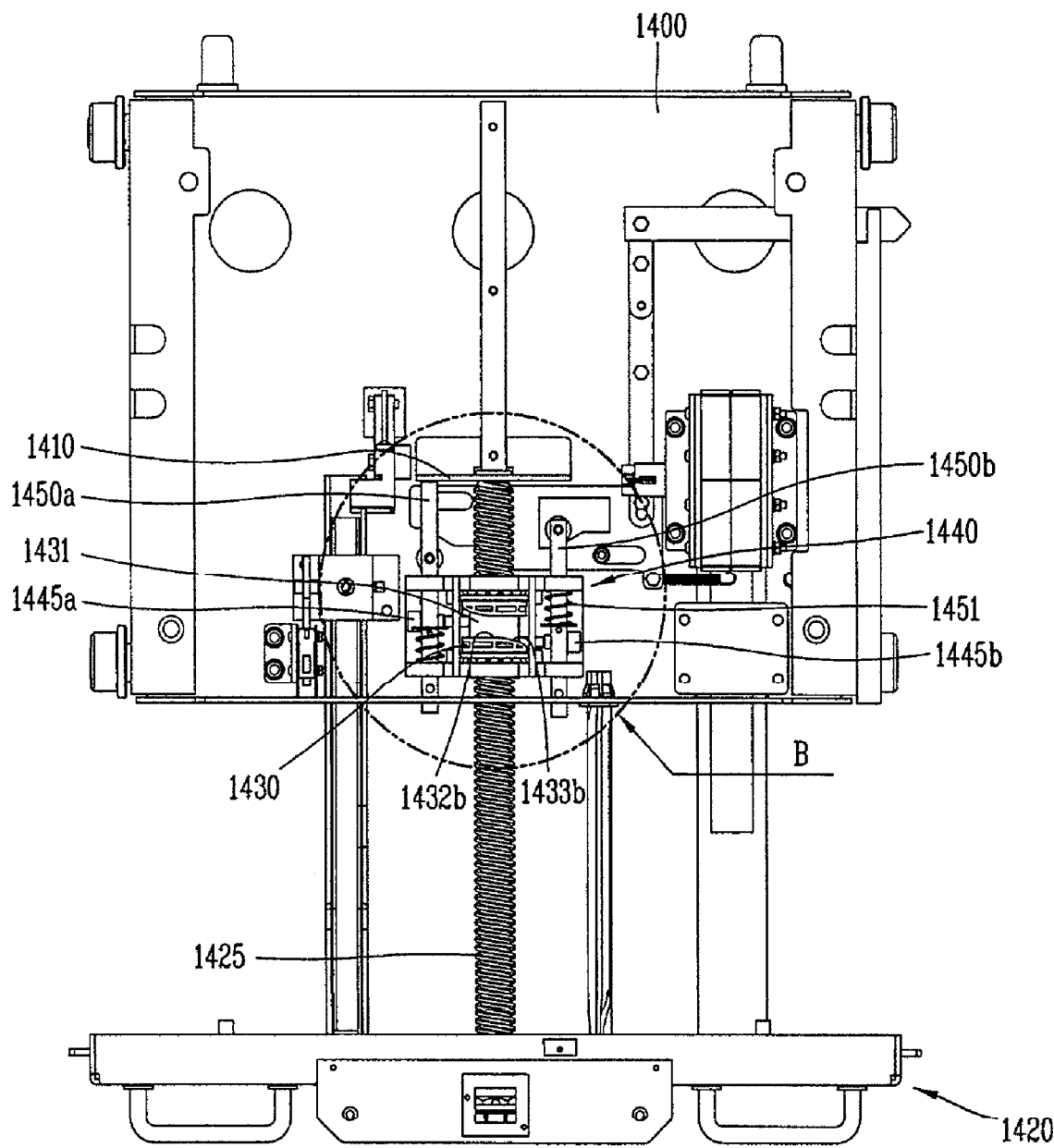
FIG. 9 is a view showing a state of the withdrawable device of a main circuit for a vacuum circuit breaker of FIG. 4 after a tulip contact of a main circuit is connected to a busbar of a cradle.
Figure 10:
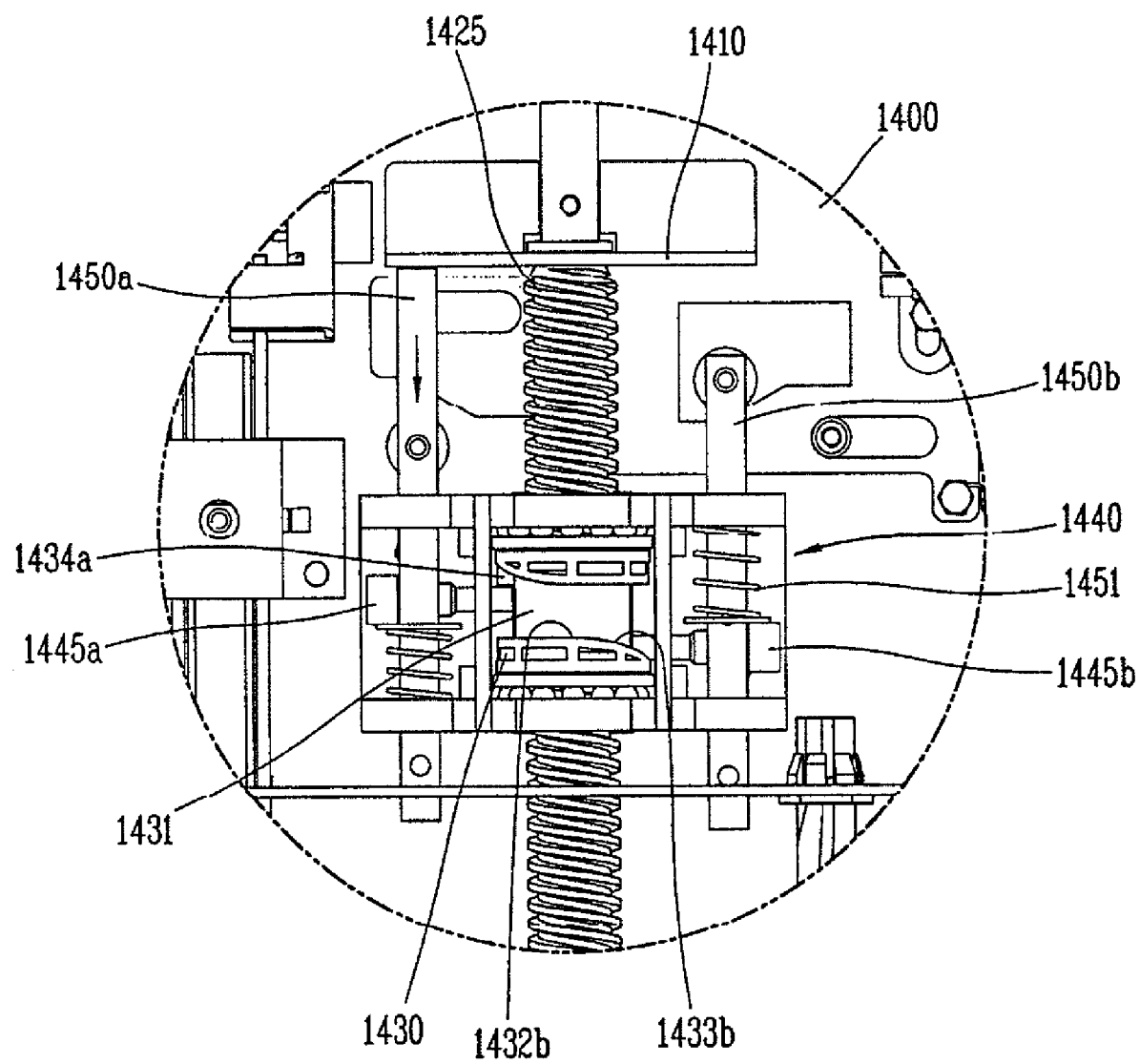
FIG. 10 is an enlarged planar view of a part 'B' in FIG. 9.

On the other hand, as shown in FIGS. 9 and 10, when the carrier 1400 has been completely moved to the rear side as the lead screw 1425 is rotated in a counterclockwise direction, i.e., when the vacuum circuit breaker is in a run state, the transfer nut 1430 is completely moved to the rear side along the lead screw 1425. Accordingly, the left driving pin 1450a comes in contact with the girder 1410. Then, the left driving pin 1450a is a little moved to the front side, and thus the left rotation prevention pin 1445a is separated from the first supporting surface 1434a of the transfer nut 1430. As a result, the transfer nut 1430 performs an idle operation thus not to be moved any longer. Here, the right rotation prevention pin 1445b is disposed within a range of a height direction of the second supporting surface 1424b, but consecutively moves to the second inclination surface 1433b, the second ring-shaped surface 1432b, and the second supporting surface 1434b. Accordingly, the transfer nut 1430 is able to perform an idle operation.

In the withdrawable device of the main circuit for the vacuum circuit breaker according to the present invention, a structure for an idle operation is simplified, and the number of components for an idle operation is reduced. An axial load is attenuated to a plane-contact distributed load, not a point-contact concentrated load, thereby preventing damage of the components.

Furthermore, the transfer nut performs an idle operation at a precise time point, thereby reducing an idle difference between at a run position and at a test position of the vacuum circuit breaker. This may enhance reliability of the idle operation of the vacuum circuit breaker at the run position and the test position.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A withdrawable device of a main circuit for a vacuum circuit breaker, comprising:
   a cradle;
   a carrier having a main circuit loaded thereon and movably disposed in the cradle, the main circuit electrically connected to or separated from the cradle;
   a lead screw for moving the carrier in back and forth directions with respect to the cradle;
   a transfer nut coupled to the carrier so as to be screw-coupled to the lead screw, for selectively transmitting a rotation force of the lead screw to the carrier according to a rotation direction of the lead screw; and
   a plurality of rotation prevention pins coupled to the transfer nut, for allowing the transfer nut to transmit a rotation force of the lead screw to the carrier while the carrier is being moved, and for allowing the transfer nut to perform an idle operation when the carrier has been completely moved,
   wherein a guide recess having a ring shape is formed on an outer circumferential surface of the transfer nut in a circumferential direction such that the rotation prevention pins are inserted thereinto in a radius direction to slide in a circumferential direction, and
   wherein a plurality of supporting surfaces are symmetrically formed on both sidewalls of the guide recess such that the rotation prevention pins are supported in opposite directions to each other.

2. The withdrawable device of a main circuit for a vacuum circuit breaker of claim 1, wherein the supporting surfaces of the guide recess are formed to be stepped in a direction perpendicular to a rotation direction of the transfer nut, and are provided with a plurality of inclination surfaces inclinably extending therefrom in opposite directions to each other and connected to the both sidewalls of the guide recess.

3. The withdrawable device of a main circuit for a vacuum circuit breaker of claim 1, wherein a plurality of driving pins are coupled to the plurality of rotation prevention pins such that the rotation prevention pins are selectively separated from the supporting surfaces by moving in a length direction of the lead screw, and
   wherein the driving pins are disposed in a length direction of the lead screw.

4. The withdrawable device of a main circuit for a vacuum circuit breaker of claim 3, wherein the plurality of driving pins are protrudingly formed in opposite directions to each other, and are configured such that one driving pin is selectively moved according to a rotation direction of the lead screw thereby to separate the corresponding rotation prevention pin from the supporting surface.

5. The withdrawable device of a main circuit for a vacuum circuit breaker of claim 4, wherein the carrier is provided with a girder for rotatably fixing one end of the lead screw thereto, and
   wherein one of the plurality of driving pins is moved by being supported by the girder according to a rotation direction of the lead screw.

6. The withdrawable device of a main circuit for a vacuum circuit breaker of claim 4, wherein a girder assembly for rotatably fixing another end of the lead screw is selectively fixed to the cradle, and
   wherein another of the plurality of driving pins is moved by being supported by the girder assembly according to a rotation direction of the lead screw.

7. The withdrawable device of a main circuit for a vacuum circuit breaker of claim 3, wherein the rotation prevention pins comprise:
   a head portion supported by an outer circumference of the driving pins;
   a body portion extending from the head portion to be inserted into the driving pins, and
   a supporting portion extending from the body portion and locked by the guide recess of the transfer nut.

8. The withdrawable device of a main circuit for a vacuum circuit breaker of claim 2, wherein the transfer nut is accommodated in a bracket fixed to the carrier, and
   wherein the plurality of driving pins are slidably coupled to the bracket by being elastically supported in opposite directions to each other with respect to the bracket.

9. The withdrawable device of a main circuit for a vacuum circuit breaker of claim 8, wherein a thrust bearing for supporting an idle operation of the transfer nut at the lead screw is provided at the bracket.

10. The withdrawable device of a main circuit for a vacuum circuit breaker of claim 8, wherein a guide plate for restricting the rotation prevention pins such that the rotation prevention pins are linearly moved along the lead screw is provided at the bracket.

11. The withdrawable device of a main circuit for a vacuum circuit breaker of claim 2, wherein buffer members for supporting the driving pins with respect to the carrier are provided at the driving pins.

* * * * *